United States Patent [19]
Nogi et al.

[11] Patent Number: 6,095,113
[45] Date of Patent: Aug. 1, 2000

[54] FUEL INJECTION APPARATUS AND CONTROL METHOD THEREOF

[75] Inventors: Toshiharu Nogi; Takuya Shiraishi, both of Hitachinaka; Yoko Nakayama, Hitachi; Minoru Ohsuga, Hitachinaka, all of Japan

[73] Assignee: Hitachi, Ltd., Tokyo, Japan

[21] Appl. No.: 09/053,518

[22] Filed: Apr. 2, 1998

[30]     Foreign Application Priority Data

Apr. 2, 1997   [JP]   Japan ................................... 9-083541

[51] Int. Cl.[7] ................................. F02B 3/04; F02B 17/00
[52] U.S. Cl. ........................ 123/295; 123/301; 123/305; 239/5; 239/497; 239/533.12
[58] Field of Search .................... 123/276, 279, 123/295, 301, 305; 239/463, 472, 473, 494, 496, 497, 533.12, 5

[56]              References Cited

U.S. PATENT DOCUMENTS

| | | | |
|---|---|---|---|
| 4,499,871 | 2/1985 | Neitz et al. ........................ | 123/305 X |
| 4,629,127 | 12/1986 | Kawamura et al. ..................... | 239/489 |
| 4,653,694 | 3/1987 | Noguchi et al. ..................... | 239/533.12 |
| 4,685,432 | 8/1987 | Saito et al. ............................. | 123/276 |
| 5,098,016 | 3/1992 | Okamoto et al. ................... | 239/497 X |

FOREIGN PATENT DOCUMENTS 2-169834   6/1990   Japan .

*Primary Examiner*—Tony M. Argenbright
*Attorney, Agent, or Firm*—Evenson, McKeown, Edwards & Lenahan, P.L.L.C.

[57]              ABSTRACT

Fuel-air mixture is stabilized with respect to the neighboring area of an ignition plug without any effect on deflection of fuel spray due to the air flow (swirl/tumble) in a combustion chamber, and the deposition of fuel onto the side wall of a combustion chamber is reduced, leading to the prevention of smoke.

To that end, a fuel injection apparatus includes a fuel injection valve having a nozzle opening to a combustion chamber and an ignition plug, in which the fuel injection valve forms a fuel spray having different. levels of average speed. The fuel injection valve forms a fuel spray having relatively high speed at least in a half way of a single cycle of a fuel injection, and after that, the fuel injection valve forms relatively low-speed fuel spray, and consequently, a fuel-air mixture including high-speed fuel spray is supplied to a neighboring area of the ignition plug.

16 Claims, 18 Drawing Sheets

FUEL INJECTION APPARATUS AND CONTROL METHOD THEREOF

BACKGROUND AND SUMMARY OF THE INVENTION

This application claims the priority of 9-083541, filed Apr. 2, 1997, the disclosure of which is expressly incorporated by reference herein.

The present invention relates to a fuel injection apparatus and control method therefor. In particular, the present invention is suitable for a system for injecting fuel directly into the combustion chamber.

As for prior art apparatus, an engine having a fuel injection valve with a nozzle opening to the combustion chamber is disclosed in Japanese Patent Application Laid-Open No. 2-169834 (1990). In this fuel injection valve, a swing force is applied to the fuel flow in order to improve the granularity of the fuel mist and reduce the spray speed, and consequently prevent the fuel from depositing on a wall of the combustion chamber.

In the known fuel spray with its spray speed reduced, as the fuel spray is liable to be deflected due to the air turbulence (swirl/tumble) in the combustion chamber, and the fuel-air mixture can not be supplied stably to the neighboring area of the ignition plug, the fuel combustion tends to be unstable.

An object of the present invention is to provide a fuel injection apparatus and control method therefor in which the fuel-air mixture can be supplied to the neighboring area of the ignition plug without fuel spray deflection due to the air turbulence (swirl/tumble) in the combustion chamber and the fuel depletion on the combustion chamber wall is reduced as well, leading to soot reduction.

Another object of the present invention is to provide a fuel injection valve and a method of injecting fuel, by which the ignition can be improved, the production of soot can be reduced, and the stability of combustion can be improved when the engine speed is operating at high speed, even if the combustion is at a lean-burn state (i.e., an air/fuel ratio is about 20–50).

In order to achieve the above objects, a fuel injection valve having a nozzle opening to the combustion chamber inside and an ignition plug are provided so that the fuel injection valve may form fuel spray having different levels of average speed.

Preferably, the fuel injection valve forms relatively high-speed fuel spray at least in the half way of the single cycle of the fuel injection, and after that, it forms relatively low-speed fuel spray. Thus, the fuel-air mixture comprising high-speed fuel spray can be supplied to the neighboring area of the ignition plug.

Furthermore, a fuel injection valve for an engine is provided with a valve body, a valve seat, a nozzle opening and a fuel guide in a nozzle portion. In addition, the fuel guide forms a plurality of fuel swirling passages, each of which has different swirling strength.

Preferably, the fuel swirling passages which have less swirling strength are formed at the nozzle opening side, compared with fuel swirling passage which have larger swirling strength.

According to the present invention, the low-speed fuel spray does not deposit on the combustion chamber wall surface and the piston wall surface but diffuses in the combustion chamber and forms the fuel-air mixture. The fuel-air mixture formed with the high speed fuel spray supplied to the neighboring area of the ignition plug is ignited, and the generated flame kernel is propagated as well as diffused by spray force and air flow into the fuel-air mixture formed by the low-speed fuel spray. Consequently, it will be appreciated that the stabilization of combustion and the prevention of soot generation by reducing the deposition of fuel spray onto the combustion chamber wall surface and the piston wall surface can be established together.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
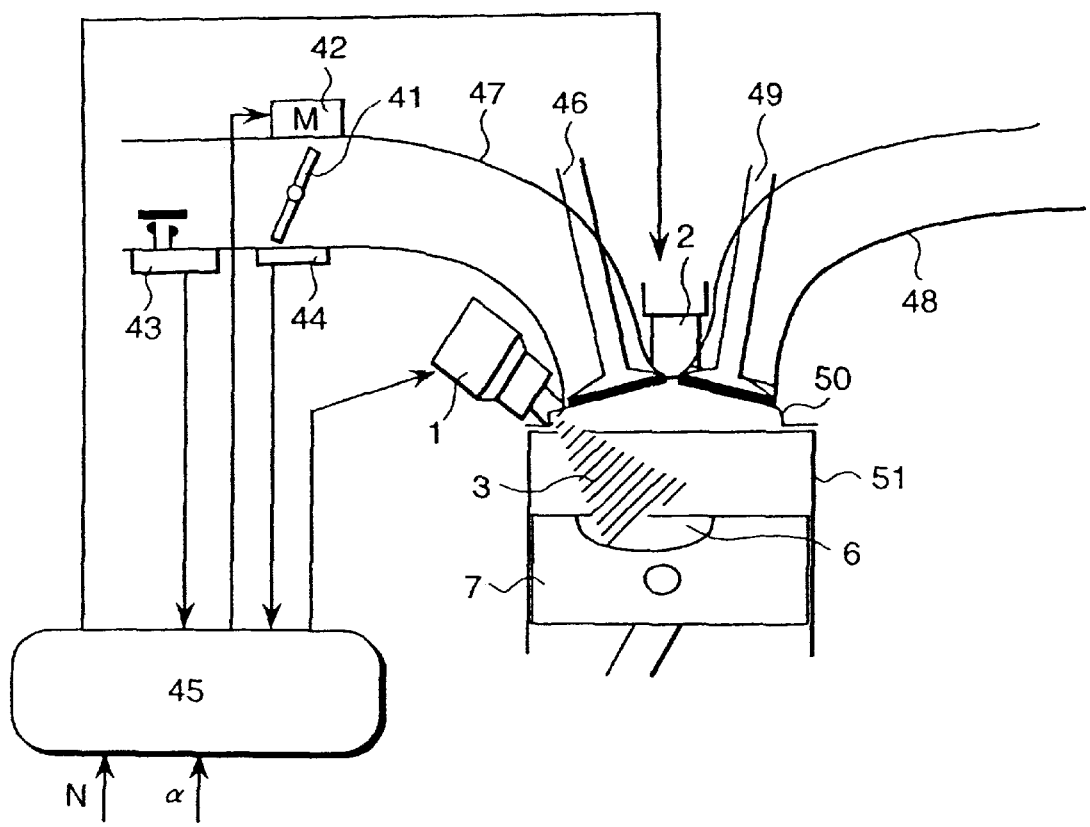
FIG. 1 is a schematic view of one embodiment of apparatus of the present invention.

The fuel injection valve 1 and the ignition plug 2 shown in FIG. 1 are mounted on the engine head 50. After the intake air is measured by the air flow meter 43, the intake air passes through the throttle valve 41, and reaches the combustion chamber 51 through the intake pipe and the intake valve 46. The fuel spray 3 is injected from the fuel injection valve toward the cavity 6 formed on the piston 7. The fuel injection valve is driven intermittently by the controller 45. The signals of the air flow meter, the revolution speed N, the accelerator divergence angle a and the signal of the throttle valve divergence angle signal sensor 44 are read by the controller, and the fuel spray amount, the fuel spray timing, the ignition timing and the throttle valve divergence angle are controlled. The throttle valve may be controlled by the motor 42 independently of the accelerator.

Figure 2:
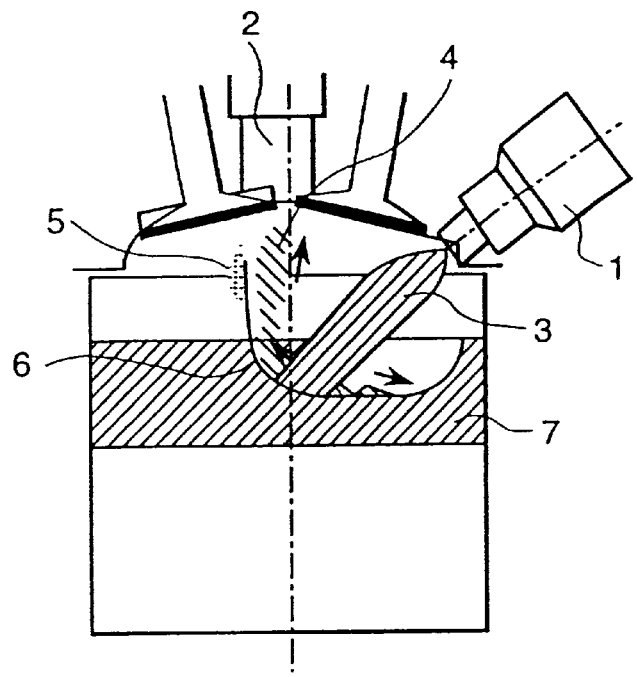
FIG. 2 is a descriptive diagram of the operation of the apparatus the present invention shown in FIG. 1.

FIG. 2 shows an example in which the fuel spray having high speed is supplied. The fuel spray is injected from the fuel injection valve toward the cavity 6 formed on the piston 7. The duration time until the fuel injection is the period of time while the fuel spray can be captured in the cavity of the piston, for example, at the angle range between 30 degree and 60 degree before the top dead center in the compression stroke. The fuel spray colliding with the cavity is vaporized and forms the fuel vapor 4, and the combustible gaseous mixture of the fuel vapor and the air is established near the ignition plug 2. As the spray speed is larger, the gaseous mixture flows up toward the ignition plug due to the fuel spray energy and the air flow in the compression stroke. On the other hand, the residual fuel not vaporized creates a liquid membrane in the combustion chamber, which leads to the reduction of the fuel-air mixture and consequently, the occurrence of sooty combustion. Therefore, it is well understood that the fuel spray having high speed can supply stable gaseous mixture of fuel and air near the ignition plug, but that the excess amount of fuel spray may cause remaining unvaporized fuel and the occurrence of sooty combustion.

Figure 3:
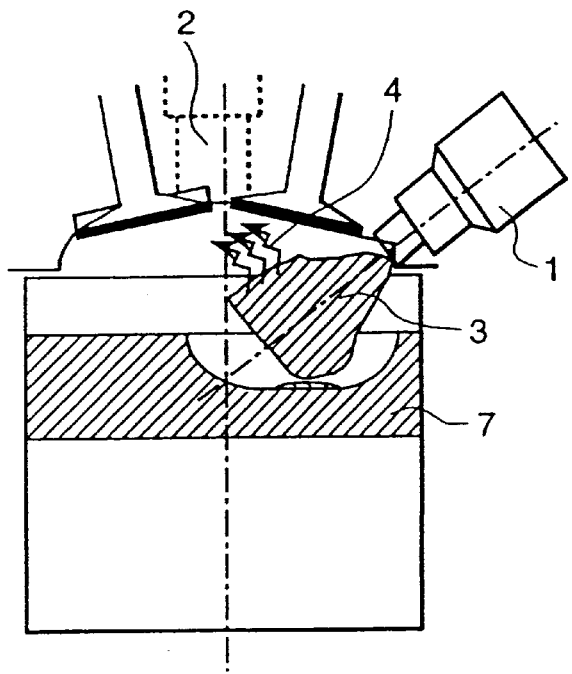
FIG. 3 is a similar descriptive diagram of the operation of the apparatus of the present invention shown in FIG. 1.

FIG. 3 shows an example in which the low-speed fuel spray is supplied. As the fuel spray speed is low, the deposition of fuel on the piston is small and the fuel spray can be dispersed widely in the combustion chamber. The dispersed fuel evaporates and mixes with the air while on the compression stroke, leading to soot-free combustion. However, as the energy of the fuel spray itself is small, the fuel spray tends to be deflected by the air flow in the combustion chamber, and hence, it is difficult to supply constantly the stable gaseous mixture to the neighboring area of the ignition plug.

Figure 4:
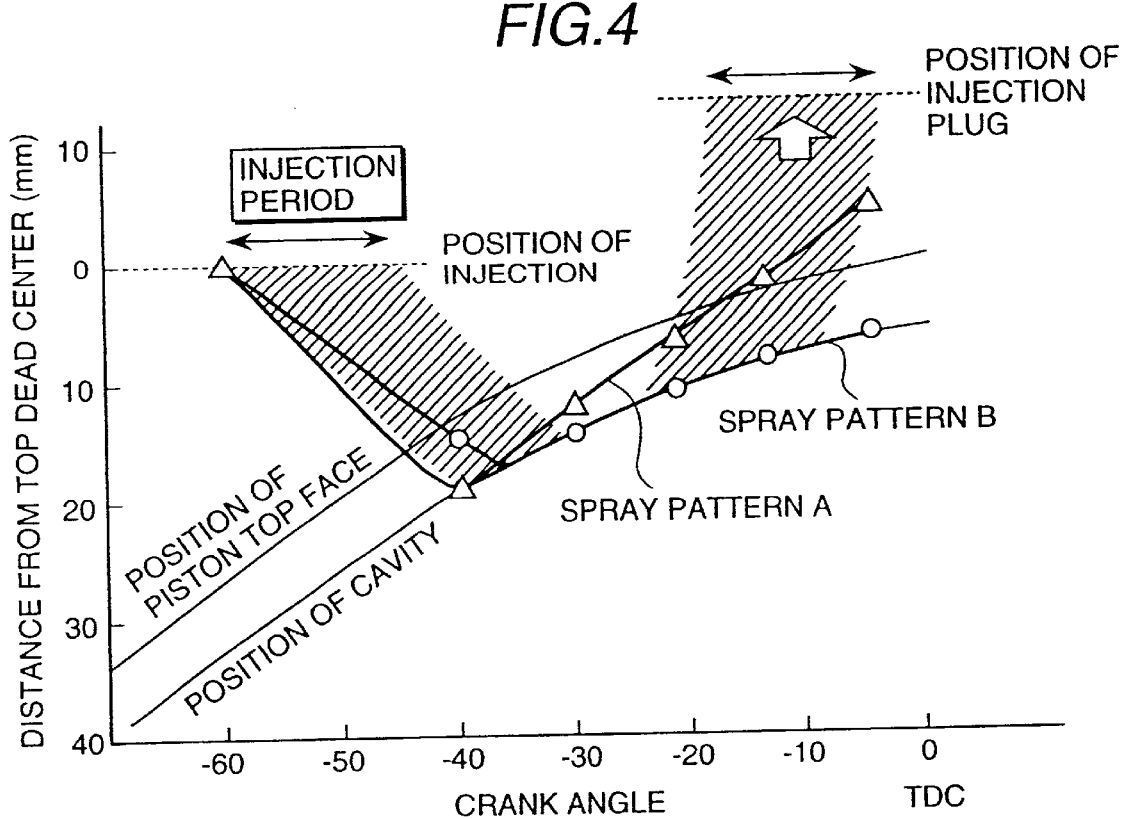
FIG. 4 is a descriptive graph of the operation of the apparatus of the present invention shown in FIGS. 1–3.

FIG. 4 is a graph in which the horizontal axis represents the crank angle and the vertical axis represents the distance from the top dead center. The number 0 on the vertical axis means the top dead center in the compression stroke. In the spray pattern A in which the spray speed is high (FIG. 2), the fuel spray reaches the cavity at the crank angle of about 40 degree, and after that, the gaseous mixture can be formed near the ignition plug by the piston action and the spray energy. On the other hand, in the spray pattern B in which the spray speed is low (FIG. 3), the fuel spray reaches the cavity at the crank angle of about 35 degree, but the gaseous mixture can not blow up to the ignition plug because the spray energy is low. In this case, though the fuel spray reaches the cavity, the disposition of the fuel liquid onto the cavity is small.

Figure 5:
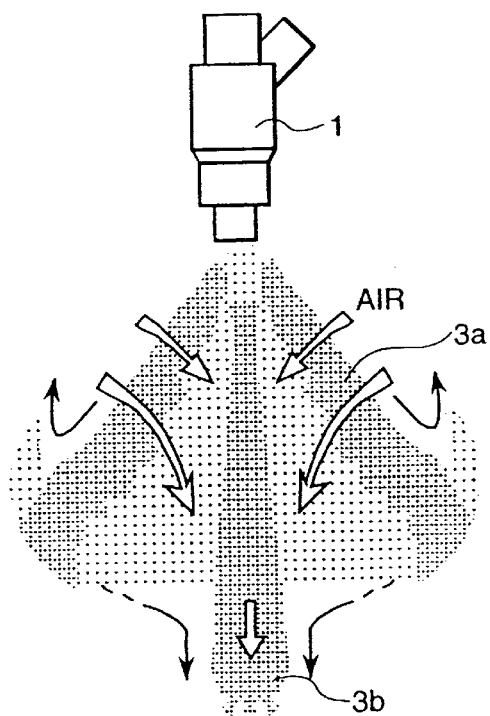
FIG. 5 is a schematic diagram of fuel spray produced in the present invention.

FIG. 5 shows an example of the spray structure in the present invention. The spray 3b with high speed is formed inside the spray 3a with low speed. The spray angle for the spray with low speed is larger in order to promote the mixing action of the fuel and the air. In contrast, the spray angle for the spray with high speed is relatively small in order to increase the directivity or directionality in relation to the ignition plug. As the high-speed spray 3b generates negative pressure as it goes downstream, the low-speed spray 3a gets sucked into the spray 3b, leading to the reduction of spray angle of the low-speed spray 3a. This phenomena is distinguished where the circumference resistance is low and that the ambient pressure is high. For example, as the ambient pressure is between 0.3 MPa and 0.5 MPa when injecting the fuel while the compression stroke in order to establish lean-burn operation, the spray angle is smaller than in the case of injecting the fuel during the intake stroke. This characteristic is preferable for direct fuel injection engines because the gaseous mixture in a lean-burn mode can be localized near the ignition plug and the spray angle can be large in order to increase the utilization ratio of the air, for example, for high intensity combustion.

Figure 6:
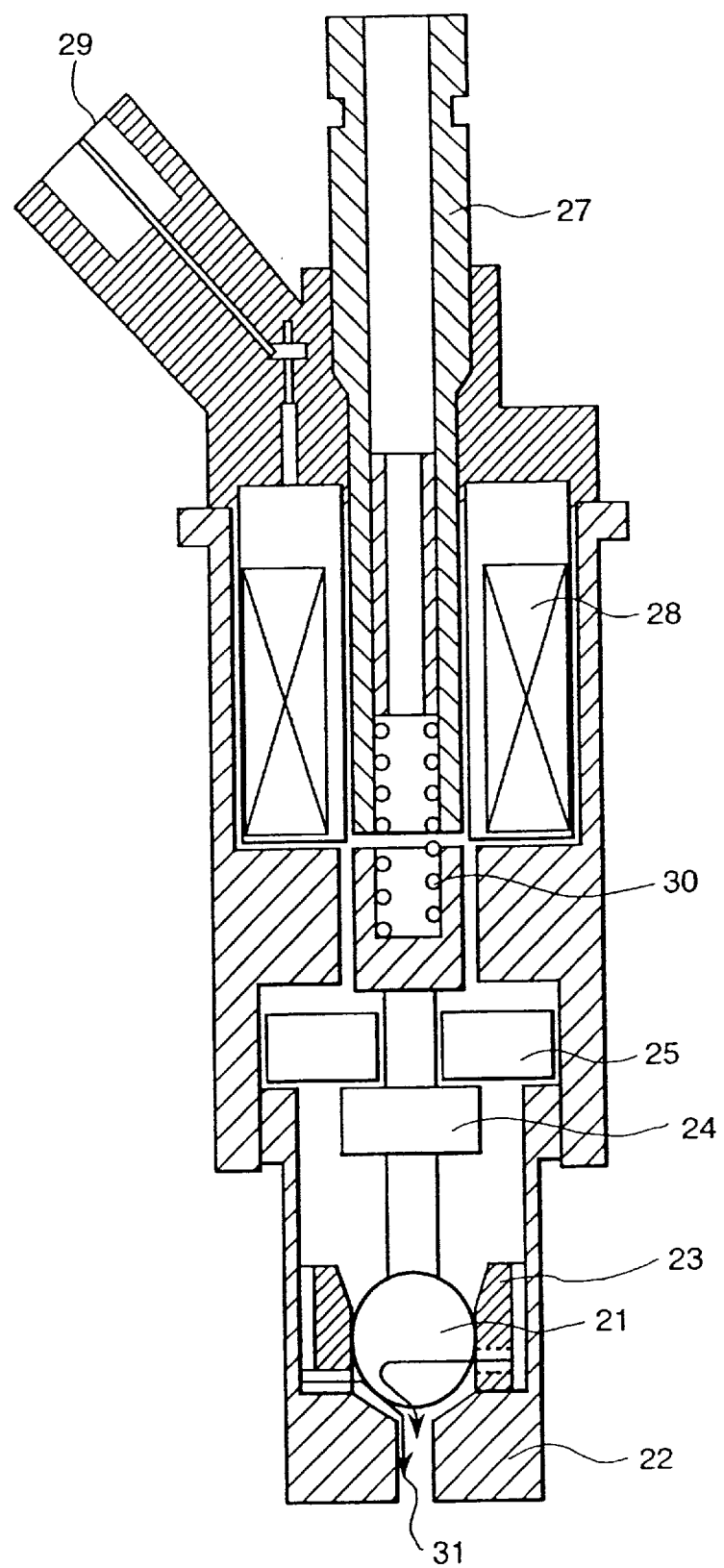
FIG. 6 is a cross-sectional view of the injection valve used in the present invention.

FIG. 6 shows an example of the structure of the injection nozzle for accomplishing the foregoing. The valve body 21 is linked to the plunger 24 and lifted by the coil 28. The power voltage is applied intermittently through the connector 29 to the coil. When the power voltage is not applied, the valve body 21 is pressed to the valve seat 20 by the spring 30. The fuel swirler 23 for swirling the fuel is arranged around the valve body, with which the fuel to be injected is swirled and the atomization of the fuel and its diffusion is facilitated. It is allowed to form the step part 24 at the plunger and limit the stroke of the valve body by the stopper 25.

Figure 7A:
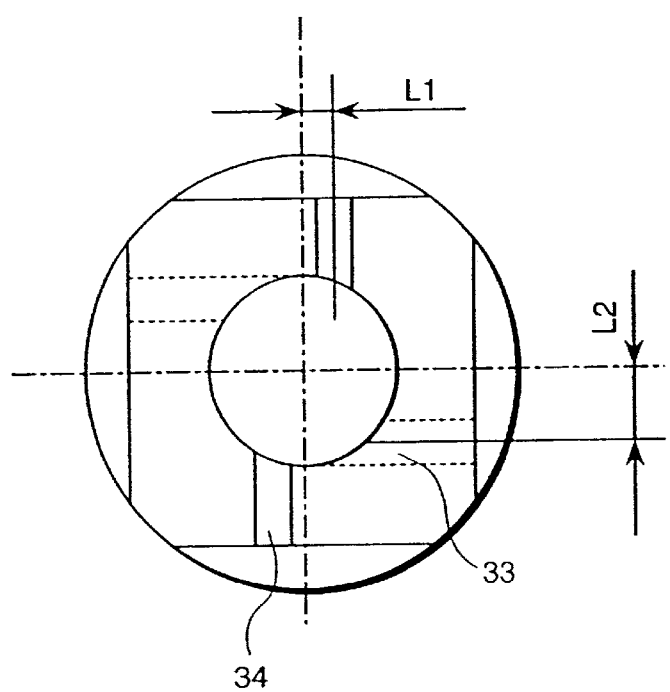
FIGS. 7A–7C are respectively a top view, a cross-sectional view and an explanatory graph of the fuel swirler according to a first embodiment of the present invention.
Figure 7B:
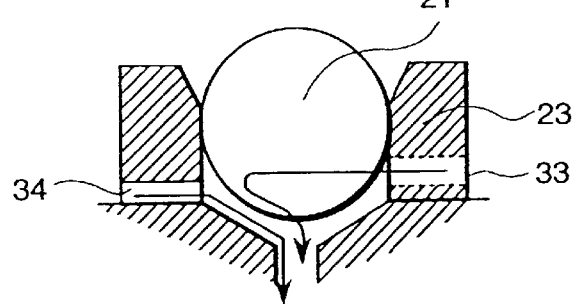
Figure 7C:
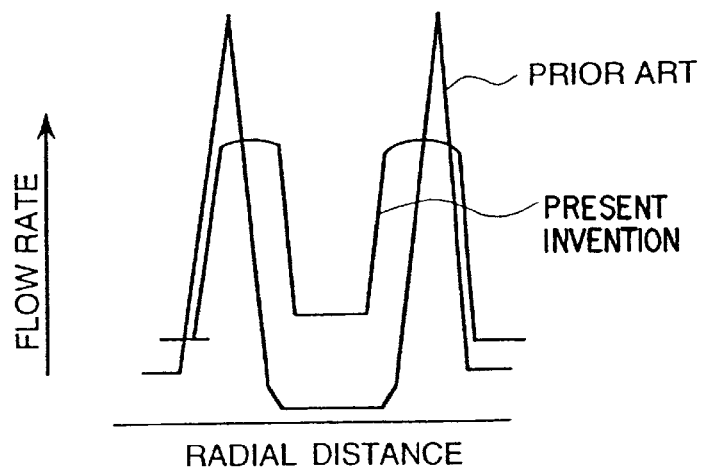

FIG. 7 shows the structure of the fuel swirler. In order to generate swirling flow in the fuel, channels are defined to be extended from the center of the nozzle 31 and their offsets L1 and L2 are defined. In this embodiment, the offset L2 is larger than the offset L1, and hence, the rotating force applied to the fuel by the channel with offset L2 is larger. Hence, the fuel spray tends to diffuse well and the spray speed in an axial direction is small. By placing the channel 34 with smaller offset at the downstream side of the channel 33 with larger offset, it is appreciated that the fuel spray having less rotating force, narrower spray angle and higher speed in the axial direction can be formed in advance and that the fuel spray having more rotating force, wider spray angle and lower speed in the axial direction can be formed later.

Figure 8A:
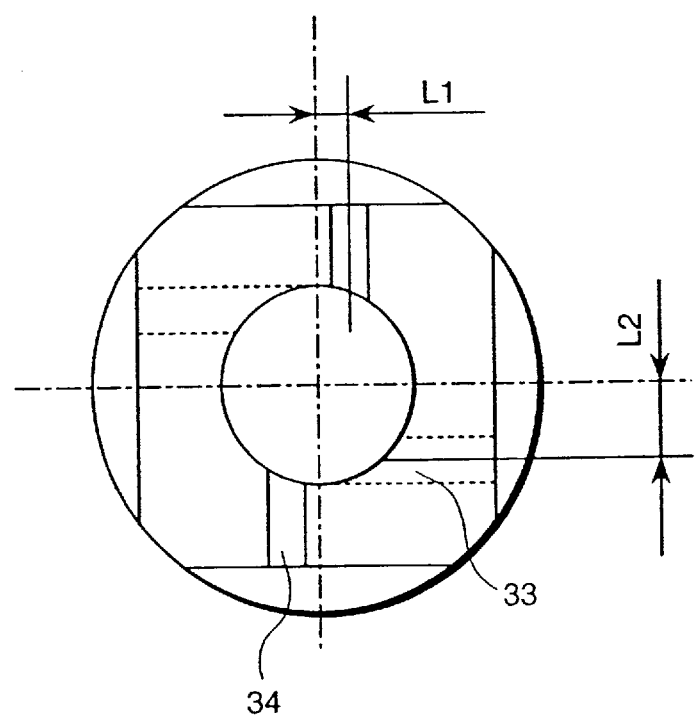
FIGS. 8A–8C are respectively a top view, a cross-sectional view and an explanatory graph of the fuel swirler according to a second embodiment of the present invention.
Figure 8B:
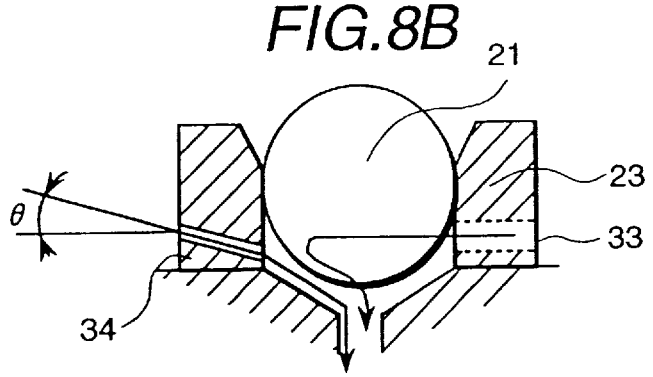
Figure 8C:
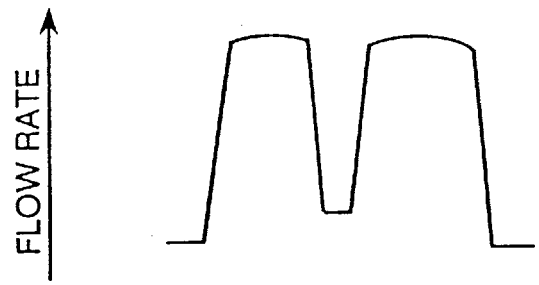

FIG. 8 shows another embodiment of the fuel swirler. In order 16 to generate the swirling flow in the fuel, channels extend from the center of the nozzle 31 and their offsets L1 and L2 are defined. In this embodiment, the offset L1 is larger than the offset L2, and hence, the rotating force applied to the fuel by the channel with offset L1 is larger. Hence, the fuel spray tends to diffuse well and the spray speed in the axial direction is small. The channel 34 with smaller offset is arranged downstream of the channel 33 with larger offset. As the channel 34 is formed in an oblique direction, compared with the structure shown in FIG. 7, the fuel spray having less rotating force, narrower spray angle and higher speed in the axial direction can be formed in advance.

Figure 9A:
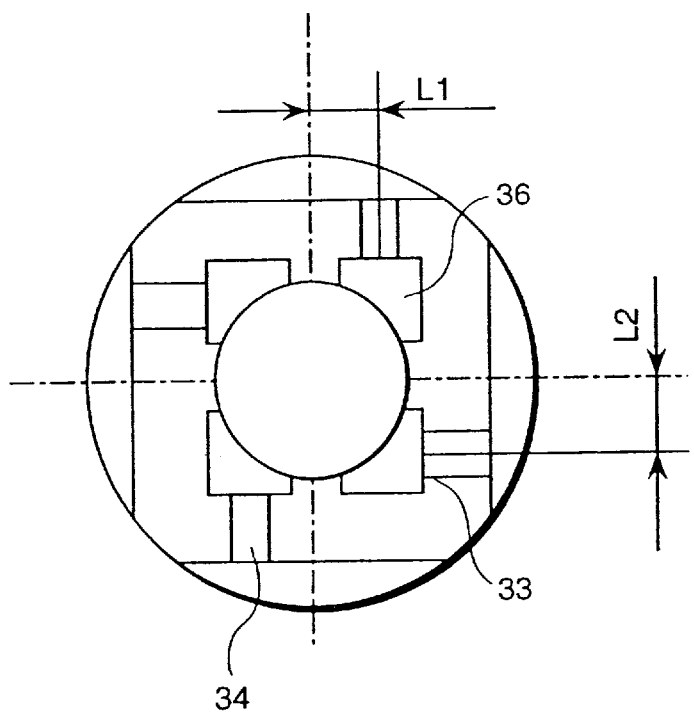
FIGS. 9A–9C are respectively a top view, a cross-sectional view and an explanatory graph of the fuel swirler according to a third embodiment of the present invention.
Figure 9B:
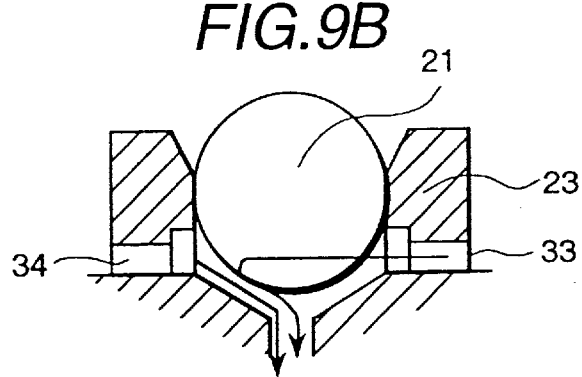
Figure 9C:
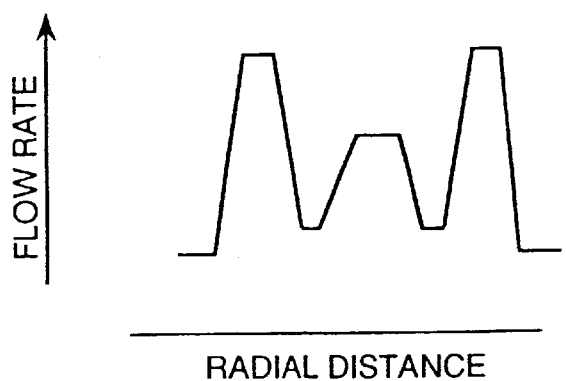

FIG. 9 shows yet another embodiment of the fuel swirler. In order to generate the swirling flow in the fuel, channels are defined to be extended from the center of the nozzle 31, and their offsets L1 and L2 are defined. In this embodiment, the offset L1 is equal to the offset L2. Hence, the fuel spray tends to diffuse well and the spray speed in the axial direction is small. The enlarged volumetric parts 34 are defined at the outlet parts of the channels 33 and 34. Thus, at the beginning of opening the valve, the fuel stored in the enlarged volumetric parts is injected at first. This configuration of the enlarged volumetric parts substantially reduces the offset of the channel with respect to the center of the nozzle, and thus, at the beginning of opening the valve, the fuel spray with narrower spray angle and higher speed in the axial direction can first be injected. After that, the fuel spray with larger rotating force, wider spray angle and lower speed in the axial direction can be formed with the fuel flowing through the channels 33 and 34.

Figure 10A:
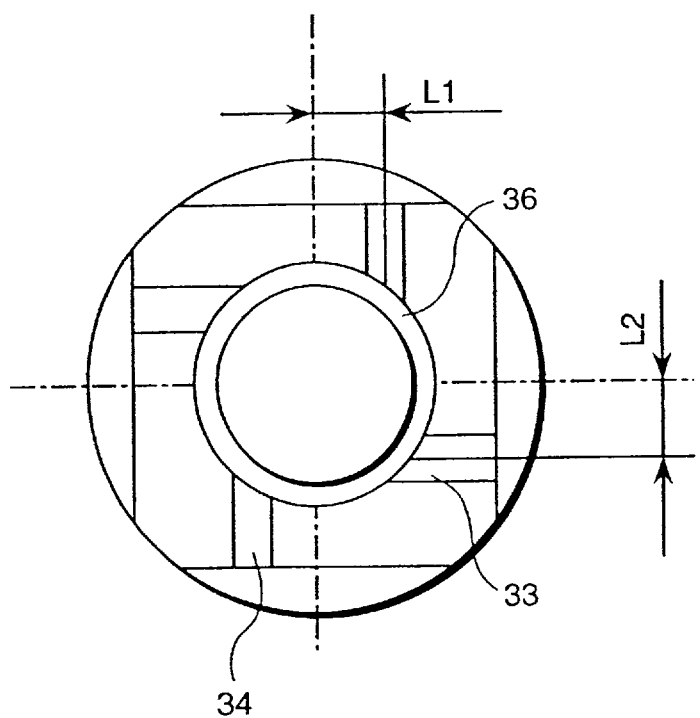
FIGS. 10A–10C are respectively a top view, a cross-sectional view and an explanatory graph of the fuel swirler according to a fourth embodiment of the present invention.
Figure 10B:
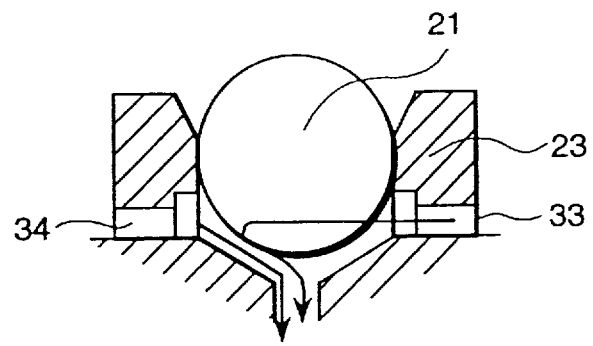
Figure 10C:
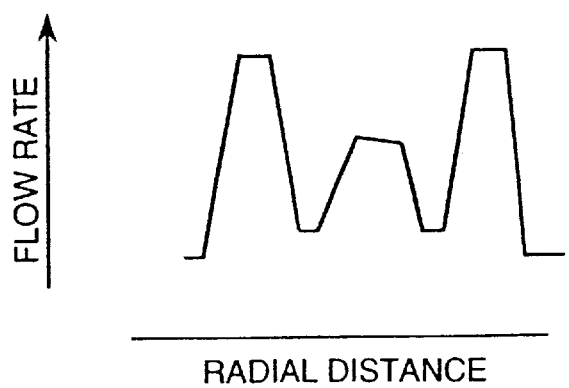

FIG. 10 shows another embodiment of the fuel swirler. In order to generate the swirling flow in the fuel, channels are defined to be extended from the center of the nozzle 31, and their offsets L1 and L2 are defined. In this embodiment, the offset L1 is equal to the offset L2. Hence, the fuel spray tends to diffuse well and the spray speed in the axial direction is small. The enlarged volumetric part 36 is defined at the outlet part of the channels 33 and 34. Thus, at the beginning of opening the valve, the fuel stored in the enlarged volumetric part is first injected. This configuration of the enlarged volumetric part substantially reduces the offset of the channel with respect to the center of the nozzle, and thus, at the beginning of opening the valve, the fuel spray with narrower spray angle and higher speed in the axial direction can be first injected. After that, the fuel spray with larger rotating force, wider spray angle and lower speed in the axial direction can be formed with the fuel flowing through the channels 33 and 34. In comparison with the structure shown in FIG. 9, as the enlarged volumetric part 36 is shaped uniformly and continuously in a circumferential direction, the fabrication of the structure is easy.

Figure 11A:
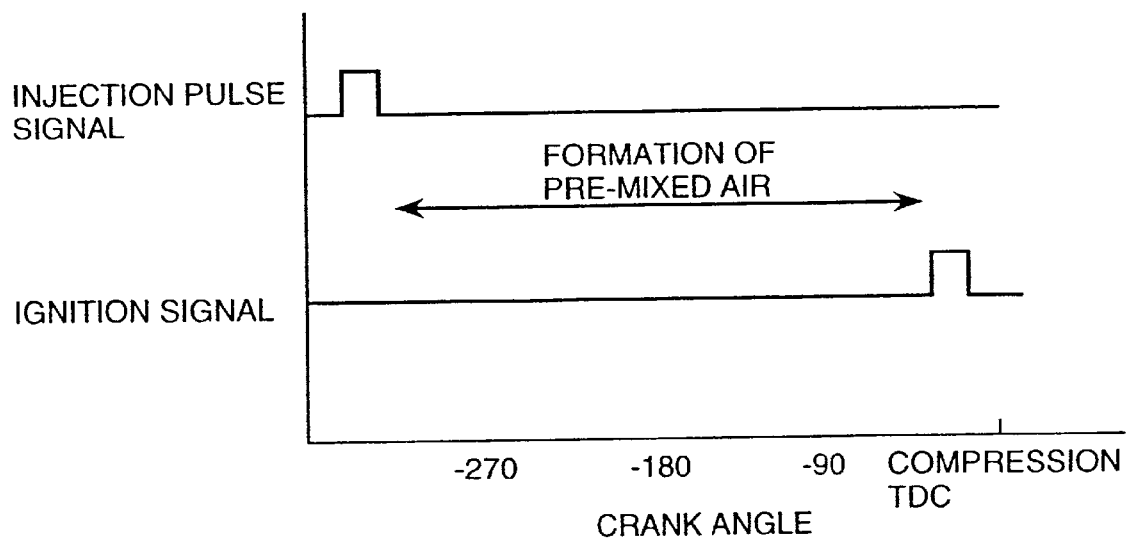
FIGS. 11A and 11B are graphs showing the relationship between the fuel injection timing and the ignition timing.
Figure 11B:
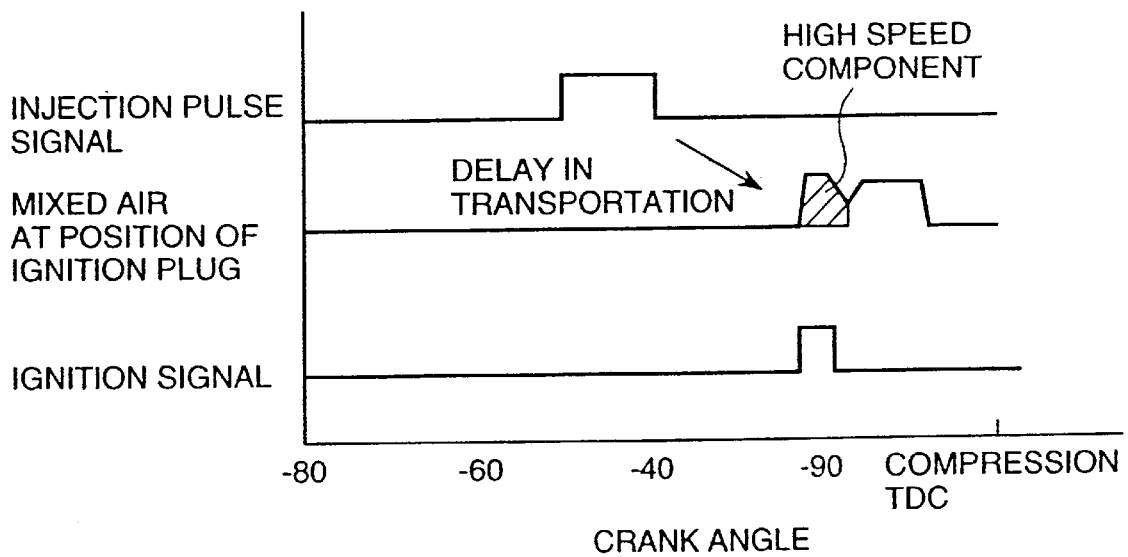

The relationship between the fuel injection timing and the ignition timing is shown in FIGS. 11A and 11B. In FIG. 11A, the fuel is injected in the intake stroke, and thereafter, the gaseous mixture of fuel and air is ignited at the intake and compression strokes before the crank angle reaches the top dead center. In an operation condition where the torque generated by the engine is larger and the amount of injected fuel is larger, the premixed air is formed. FIG. 11B shows an example of stratified combustion for lean-burn combustion. When the fuel injection is completed near the top dead center in the compression stroke, for example, before 40 degrees, the fuel spray with a high speed component comes at first after delay in transportation for the position of the ignition plug, and then, the fuel spray having a low speed component. is initiated. As described above, as the high speed component is unaffected by the air flow inside the combustion chamber, stable gaseous mixture can be established near the ignition plug. It is preferable to ignite the gaseous mixture when the high speed component reaches the ignition plug.

Figure 12A:
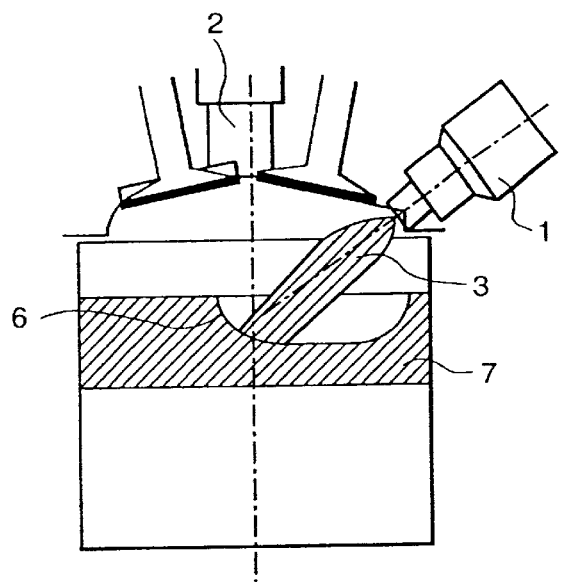
FIGS. 12A–12D are descriptive diagrams of the operation in the present invention.
Figure 12B:
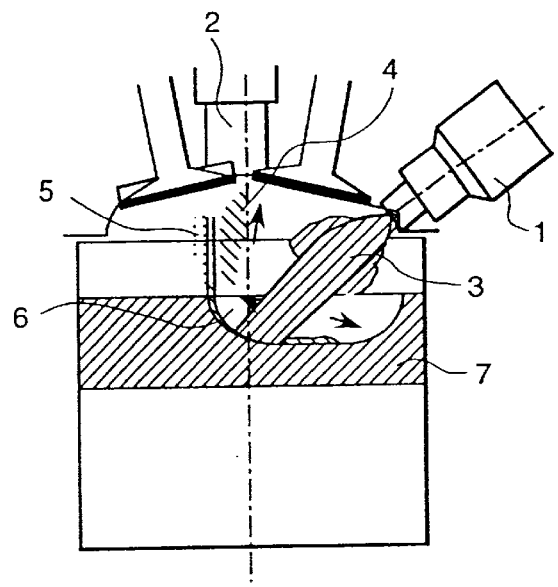
Figure 12C:
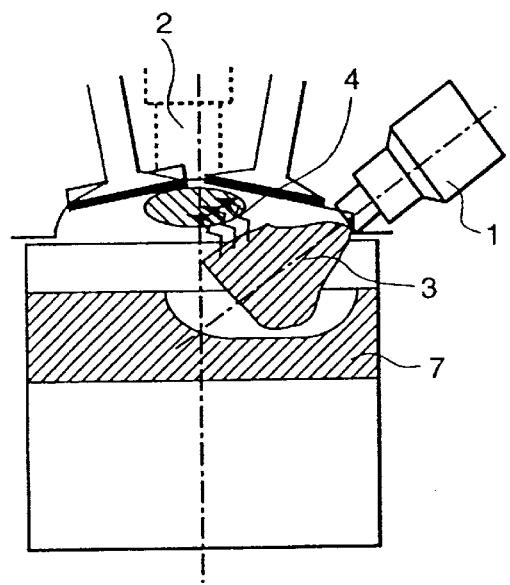
Figure 12D:
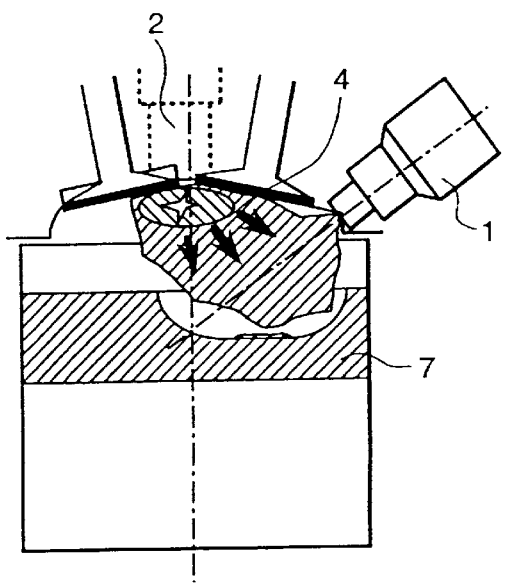

The fuel injection operation is described in FIGS. 12A–12D in relationship to the engine operation. In FIG. 12A, the fuel spray with high speed component is injected from the fuel injection valve 1 toward the piston cavity. The injected fuel collided with the piston cavity and evaporated blows up to the ignition plug due to the energy of the fuel spray itself and the air flow inside the combustion chamber. After that, while the air spray with slow speed component is diffused inside the combustion chamber, the fuel spray of high speed component is ignited, and then, the flame kernel so formed is propagated to the gaseous mixture formed with the fuel spray of slow speed component as well as the flame kernel is diffused due to the fuel spray and the air flow.

Figure 13:
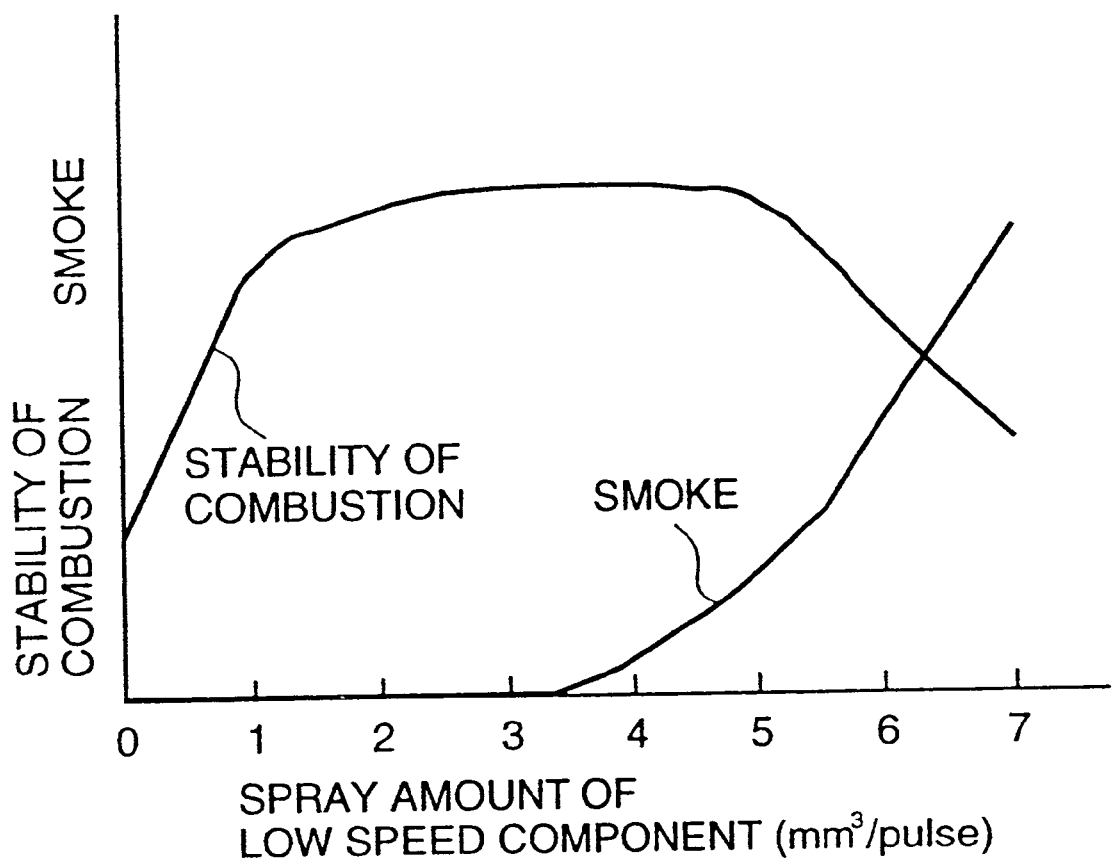
FIG. 13 is a graph showing the relationship among the spray amount of low speed component, the combustion stability and the smoke amount.

FIG. 13 shows an example of the relationship between the spray amount for low speed component and the stability of combustion and the concentration of smoke. As the spray amount of low speed component increases, the stability of combustion increases. However, in case the spray amount of low speed component is too excessive, the disposition of fuel onto the piston top surface increases and thus, the amount of smoke increases as well as the stability of combustion decreases. In this example, as the overall spray amount is about 15 $mm^3$/pulse, if 50% of the overall spray amount is occupied by the fuel spray with narrow spray angle and high speed, the amount of smoke increases. In this condition that the fuel pressure is 10 MPa, the average speed of the high speed component fuel spray is about 12 m/s under ambient pressure 0.3 MPa, and the average speed of the low speed component fuel spray is about 6 m/s. In considering the diffusion of the fuel spray inside the combustion chamber, the spray angle is preferably between 60 degree and 90 degree for a low speed component, and between 20 degree and 50 degree for a high speed component.

Figure 14A:
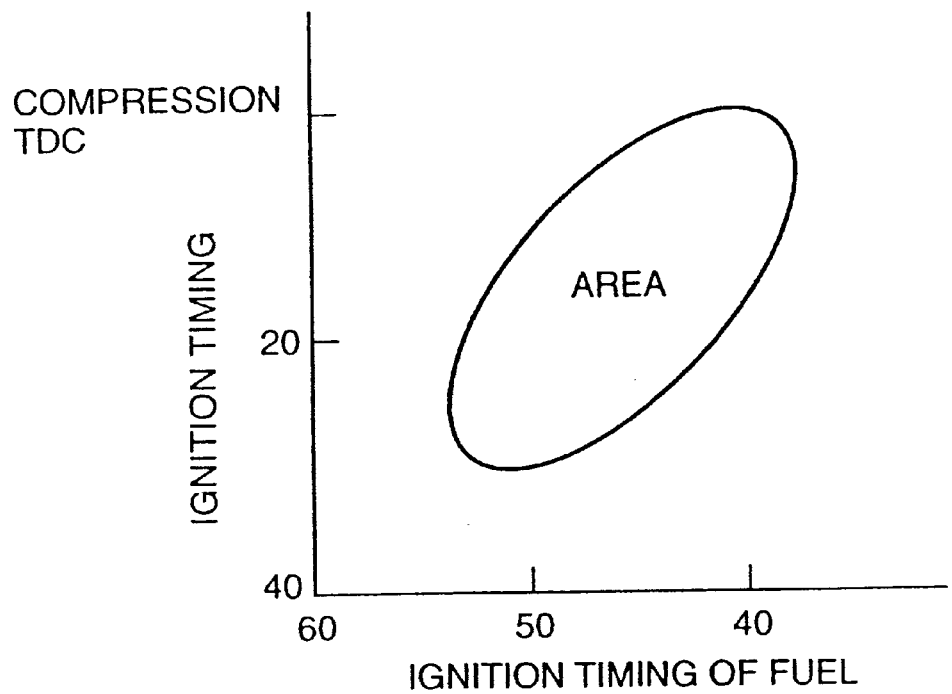
FIGS. 14A and 14B are graphs showing the relationship among the fuel injection timing, the ignition timing, the combustion stability and the smoke amount.
Figure 14B:
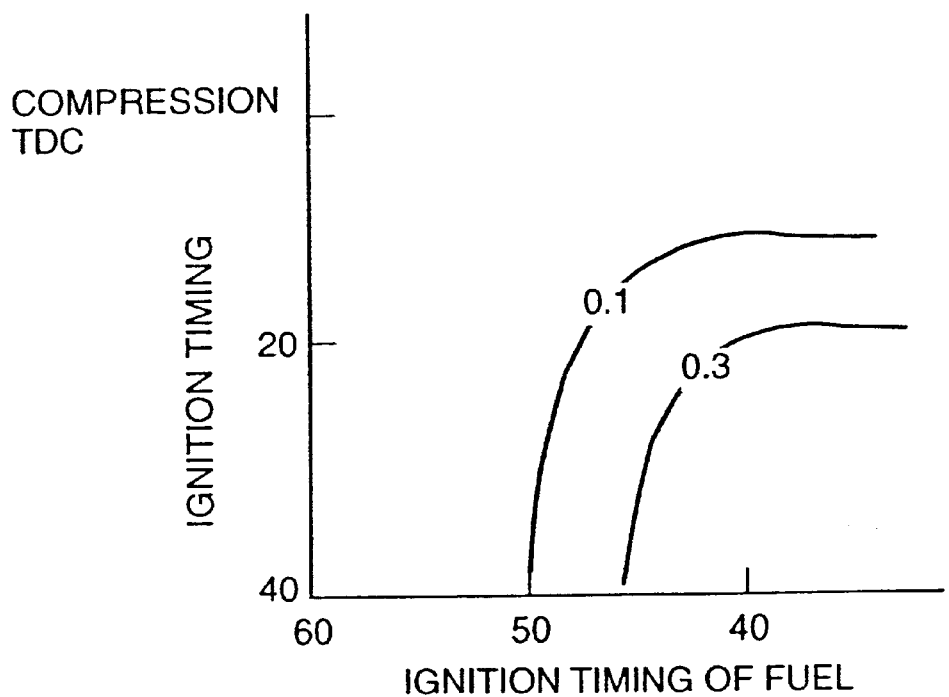
Figure 15A:
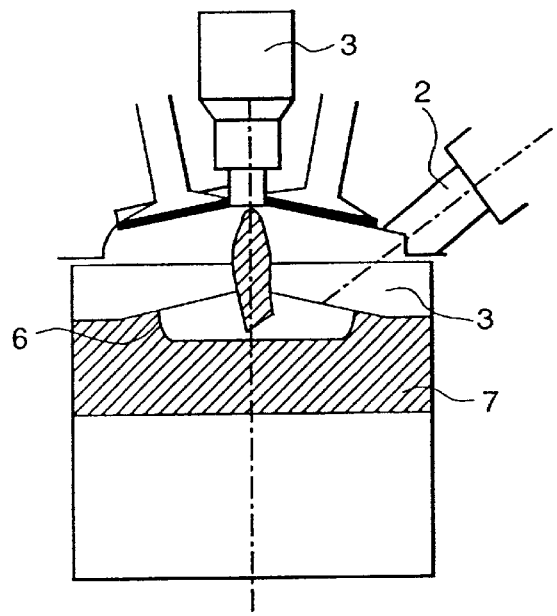
FIGS. 15A–15D are cross-sectional schematic views of a structure of another embodiment of the present invention.
Figure 15B:
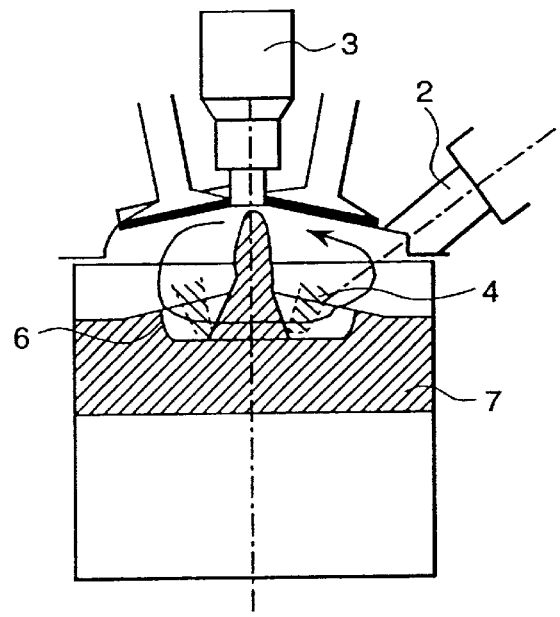
Figure 15C:
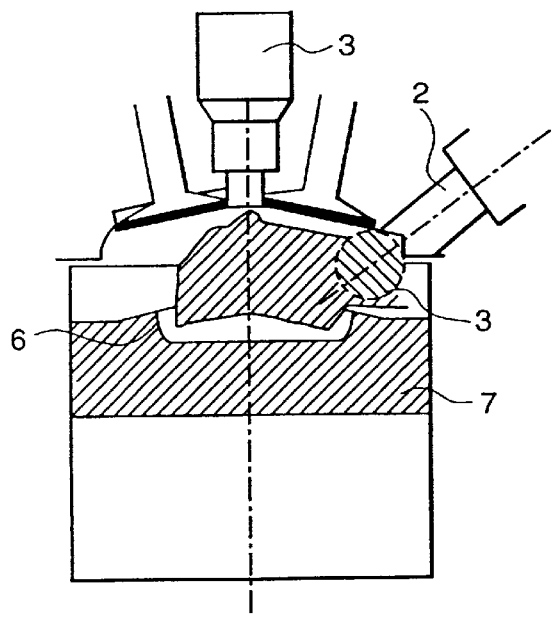
Figure 15D:
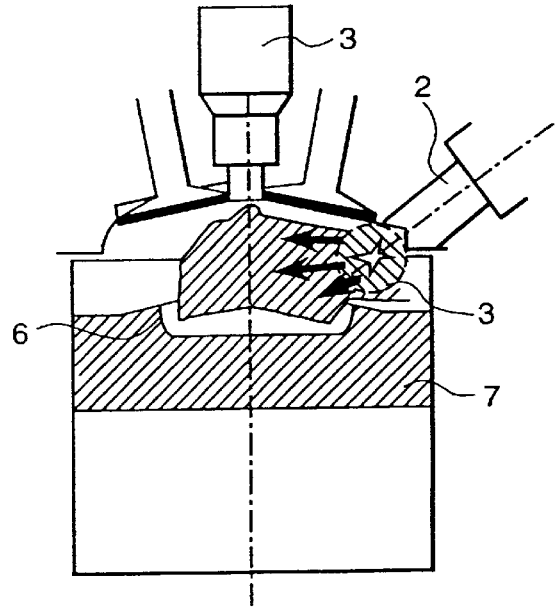

In FIGS. 14A and 14B, the combustion stability (fluctuation in the average effective pressure or engine torque) and the smoke discharge amount is shown in relation to parameters of the fuel injection timing and the ignition timing. In this example, it is understood that the combustion is stable if the ignition timing is set to be about 30 degree after the fuel injection timing. The duration time for keeping the gaseous mixture of fuel and air is longer and the utilization ratio of air becomes higher by advancing the fuel injection timing, and consequently, the amount of discharged smoke decreases. Therefore, the fuel injection timing and the ignition timing for optimizing the combustion stability can be selected so that the amount of discharged smoke may not increase.

FIGS. 15A–15D show an example where the fuel is injected from the top of the combustion chamber and the injected fuel is ignited sideways. The high speed component of the fuel spray collides with the top surface of the piston, and by drifting the evaporated fuel toward the neighboring area of the ignition plug by the air flow marked with an arrow as well as diffusing the fuel spray of slow speed component inside the combustion chamber, the occurrence of smoke can be prevented. In this example, as the high speed component of the fuel spray is certainly made to collide with the piston and evaporated, the combustible gaseous mixture can be stably supplied toward the ignition plug by the air flow, for example, tumble flow.

Figure 16A:
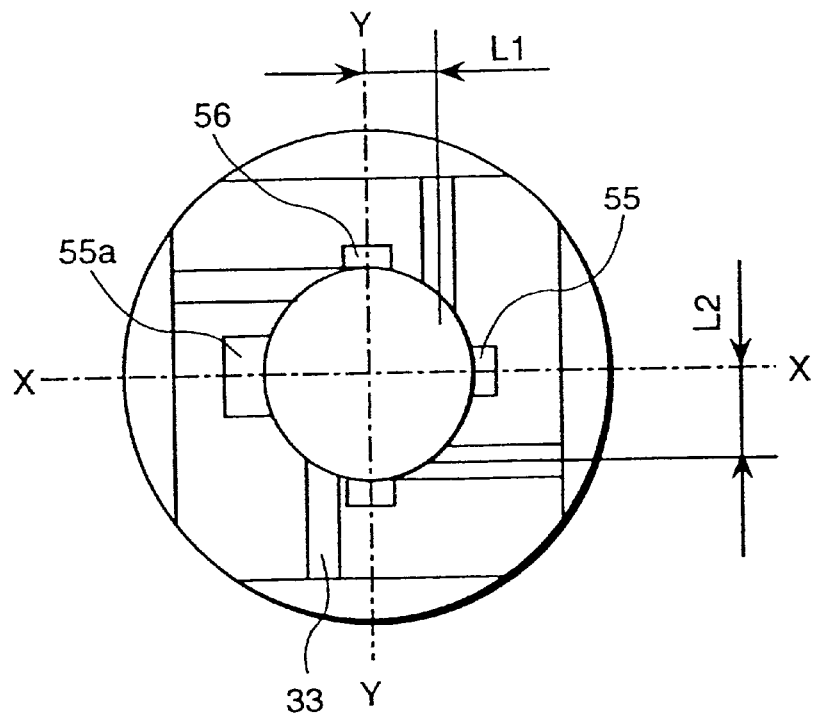
FIG. 16A is a cross-sectional view of a fuel guide according to a fifth embodiment of the present invention.
Figure 16B:
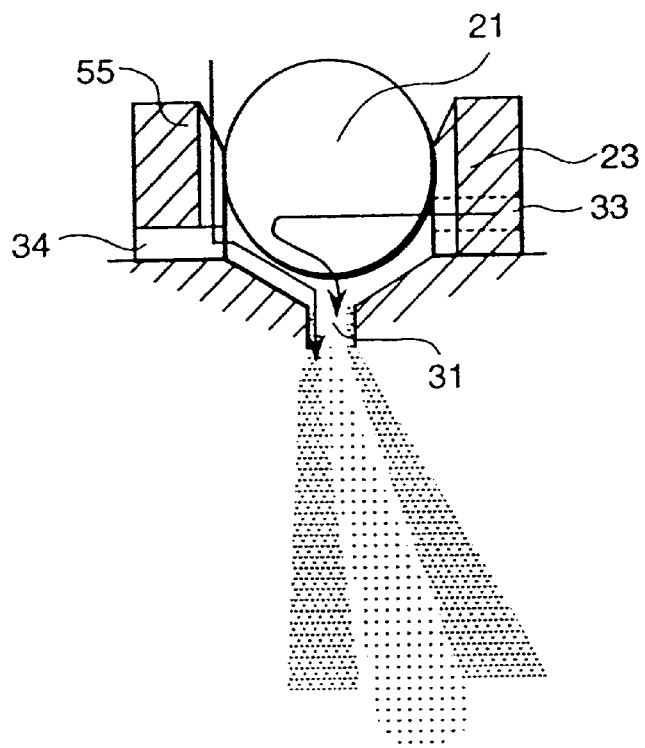
FIG. 16B is a vertical-sectional view of the fuel guide of FIG. 16A showing a state of fuel spray.

As the fifth embodiment of the fuel guide 23 shown in FIGS. 16A and 16B by making an area of a bypass passage 55a at a particular portion in a bypass passage 55 to be unequal to an area of other bypass passage 55, a speed distribution in the nozzle is controlled to form fuel spray in a direction different from a nozzle axis. Under a condition where a mounting layout of the fuel injection valve 1 is restricted, it is advantageous to permit setting of the fuel injecting direction freely. Also, it becomes unnecessary to perform a process for bending the nozzle in a particular direction.

Figure 17A:
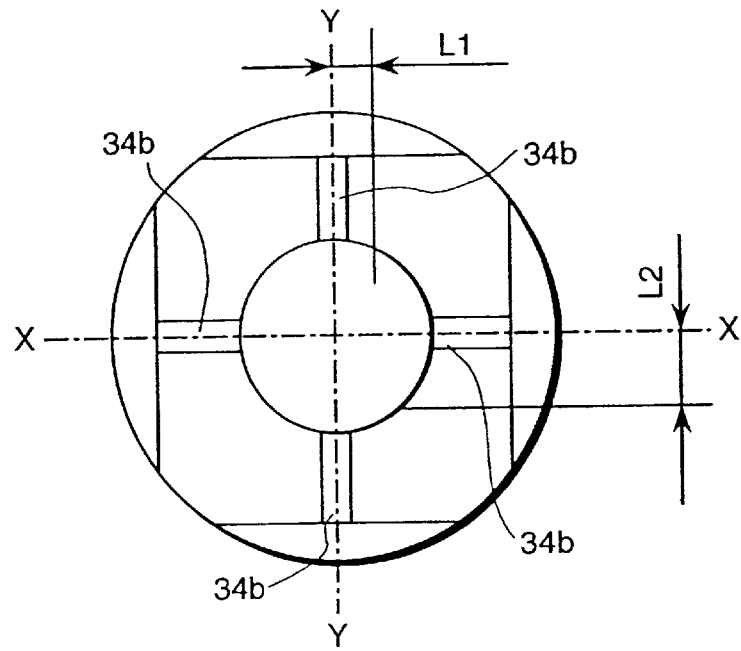
FIG. 17A is a cross-sectional view of a fuel guide according to a sixth embodiment of the present invention.
Figure 17B:
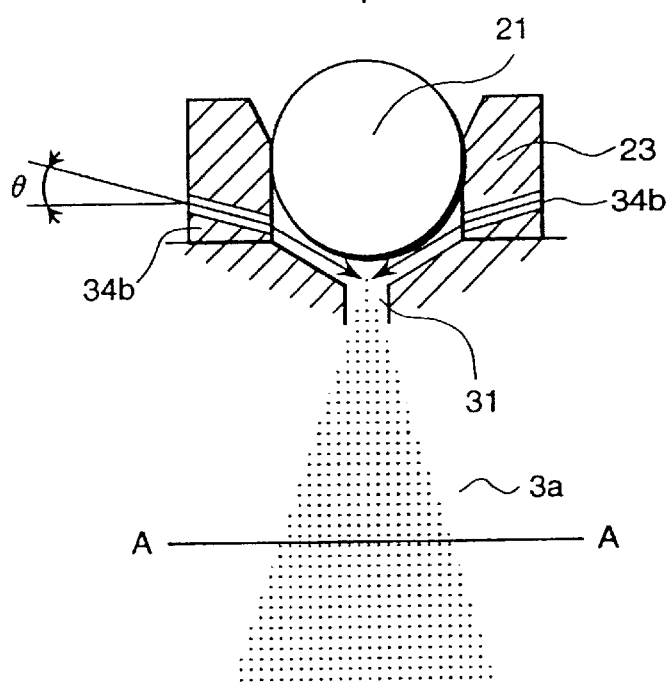
FIG. 17B is a vertical-sectional of the fuel guide of FIG. 17 A view showing a state of fu el spray.
Figure 17C:
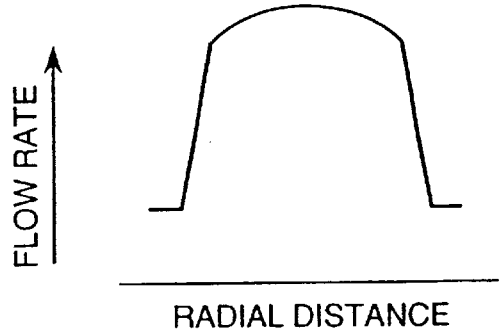
FIG. 17C is a flow distribution of the fuel spray of the fuel guide shown in FIG. 17B in a radial direction.

FIGS. 17A–17C show the sixth embodiment of the fuel guide 23 of the fuel injection valve 20. The fuel guide 23 is provided on perpendicularly intersecting imaginary lines X—X and Y—Y extending through the center of the fuel guide 23 without providing an offset in a fuel swirl aperture 34b to flow the fuel from the opposing fuel swirl aperture34b for collision. Since the collided fuel has a speed component directed to the center direction, a filled-core fuel spray, in which the fuel spray is present even in the center, can be formed.

Figure 18A:
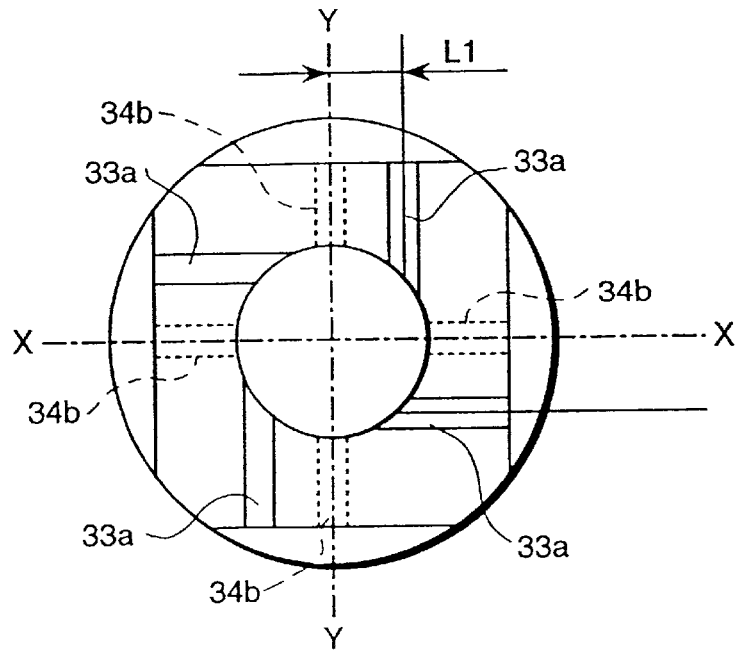
FIG. 18A is a cross-sectional view of a fuel guide according to a seventh embodiment of the present invention.
Figure 18B:
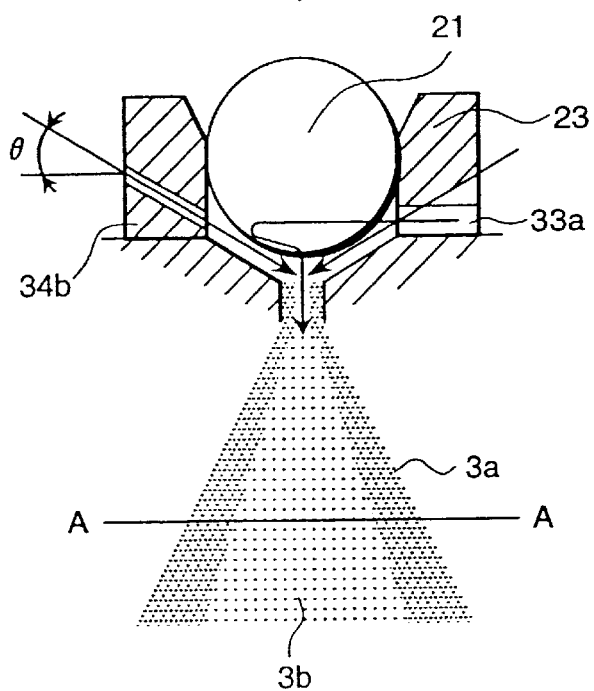
FIG. 18B is a vertical-sectional view of the fuel guide in FIG. 18A showing a state of fuel spray in the fuel guide of FIG. 18A.
Figure 18C:
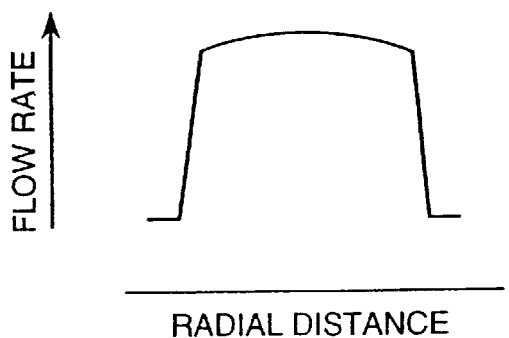
FIG. 18C is a flow distribution of the fuel spray of the fuel guide shown in FIG. 18B in a radial direction in the fuel guide of FIG. 18B.

FIGS. 18A–18C show the ninth embodiment of the fuel guide 23 of the fuel injection valve 20. A cone-shaped fuel spray is formed by a fuel swirl groove 33a and the fuel guide aperture 34b, and fuel spray is formed within the cone-shaped fuel spray by collision. By offsetting the fuel swirl groove 33a, fuel is sprayed in swirl fashion, and the fuel guide 23 is provided on perpendicularly intersecting imaginary lines X—X and Y—Y extending through the center of the fuel guide 23 without providing an offset in a fuel swirl aperture 34b, 34b to flow the fuel from the opposing fuel swirl aperture 34b for collision. In order to avoid excessive concentration of the fuel toward the center of fuel spray, the total sectional area of the groove at which the fuel collides can be made smaller than the total sectional area of the guide groove.

Figure 19A:
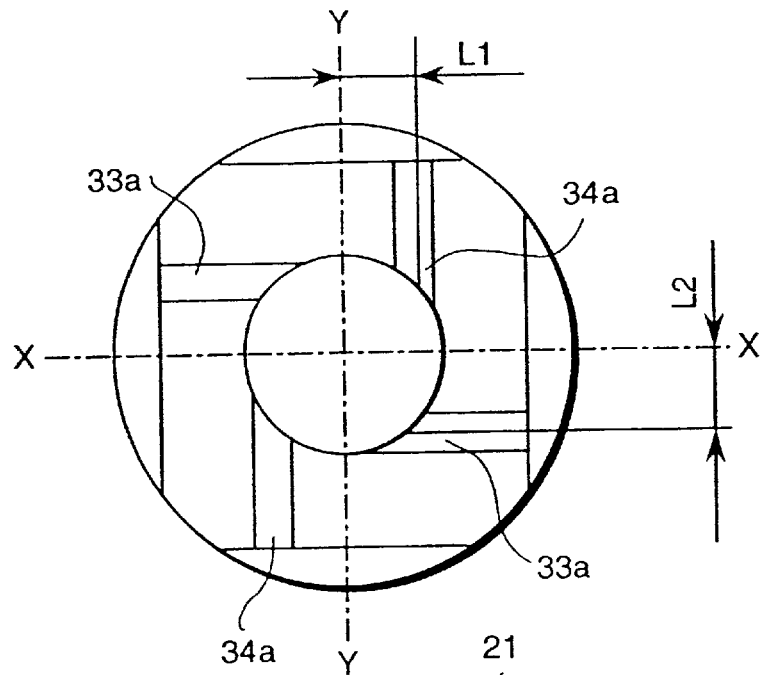
FIG. 19A is a cross-sectional view of a fuel guide according to another embodiment of the present invention, in which the valve body is conical in shape.
Figure 19B:
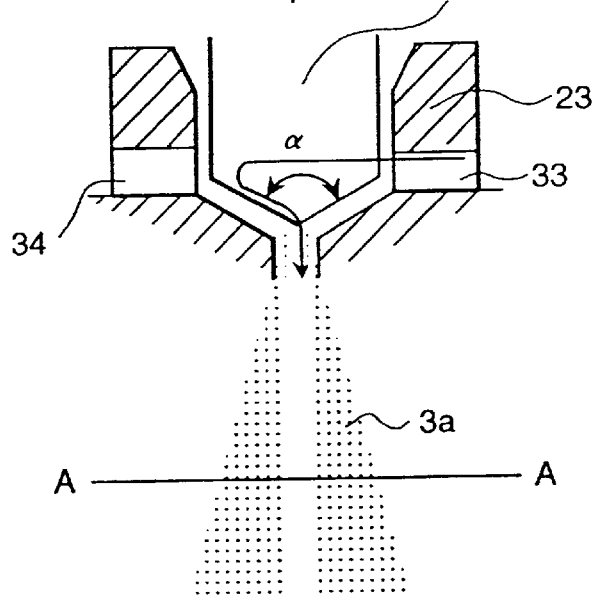
FIG. 19B is a vertical section of the fuel guide of FIG. 19A showing a state of fuel spray in the fuel guide of FIG. 19A.
Figure 19C:
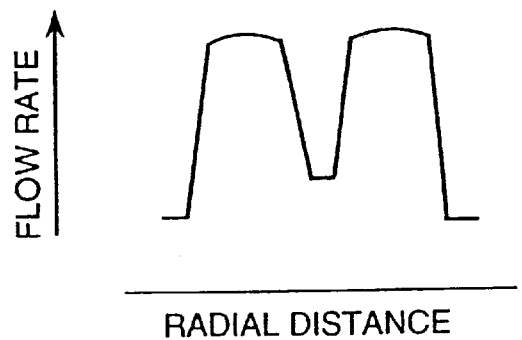
FIG. 19C is a flow distribution of the fuel spray of the fuel guide in FIG. 19A in a radial direction in the fuel guide of FIG. 19A.

FIGS. 19A–19C show an embodiment in which the valve body 21 of the fuel injection valve 1 is modified. In this embodiment, the valve body 21 is formed into cone-shaped configuration. The cone-shape of the valve body 21 makes it difficult to form a cavity on the downstream side of the valve body 21 to prevent formation of hollow fuel spray. A smaller cone angle α forms a smaller spray angle to increase the degree of filling. In this embodiment, and as in the embodiment of FIG. 7, the valve body 21 is modified into a cone-shaped valve. In conjunction therewith, the fuel guide apertures 33a and 34a are offset $L_1$ and $L_2$ in the X direction and the Y direction in the same plane.

Figure 20A:
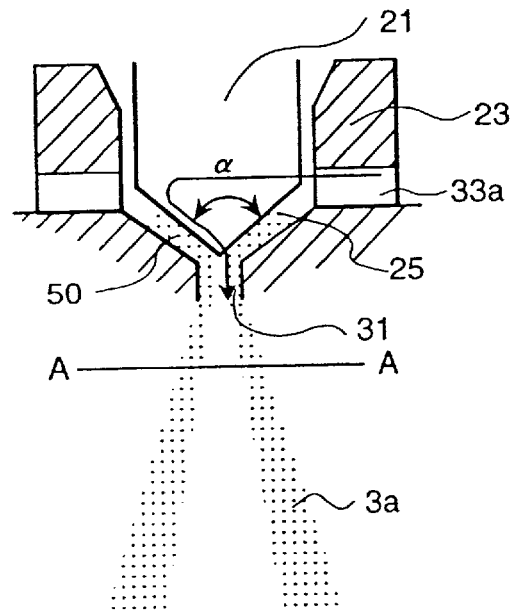
FIGS. 20A and 20B are vertical sections showing a state of fuel spray in a fuel guide according to another embodiment of the present invention, in which the valve body is conical in shape.
Figure 20B:
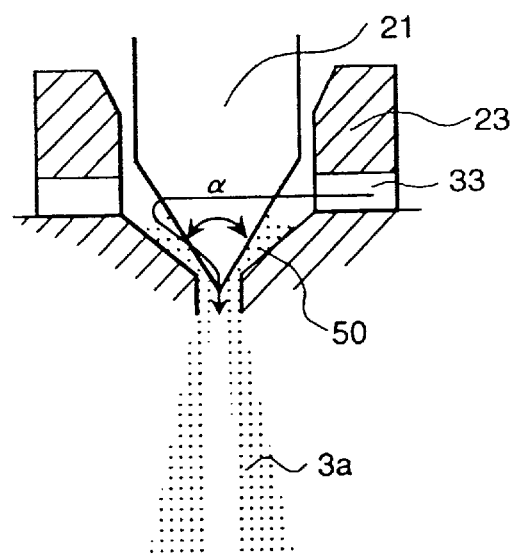
Figure 20C:
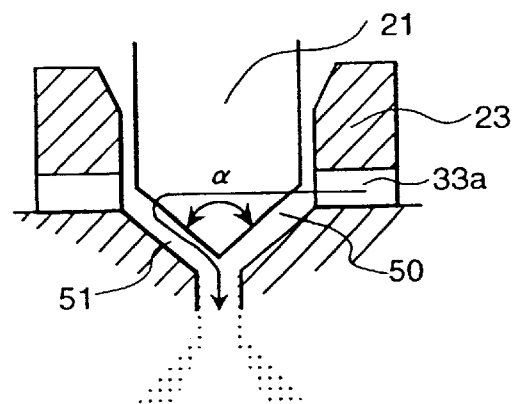
FIG. 20C is a vertical section showing an example of a state of fuel spray in the fuel guide of FIG. 20A.

FIGS. 20A–20C show the embodiment in which the first embodiment of the fuel guide 23 of the fuel injection valve 20 is modified into the cone-shaped configuration as shown in FIGS. 12A–12D. As shown in FIG. 20A, a gap 50 between the valve body 21 and the valve seat 25 is smaller at a closer position to the nozzle 31. As shown in FIG. 20C, when the gap 50 is set to be greater at a closer position to the nozzle, expanding flow is established to easily form the cavity. Once the cavity is formed, a hollow portion having no fuel on the downstream side of the valve body 25 easily forms the fuel spray hollow-shaped configuration. When the gap defined with the valve body 25 is formed for further contracting flow, fuel flow becomes stable and the occurrence of the cavity can be avoided to establish filled-core fuel spray. Restriction of the formation of the cavity may also be effective for stabilization of the fuel amount. Also, the measuring precision can be improved.

According to the present invention, by forming the fuel spray having different levels of average speed and injecting the fuel spray into the combustion chamber, it will be appreciated that the stabilization of combustion and the prevention of soot generation by reducing the deposition of fuel spray onto the combustion chamber wall surface and the piston wall surface can be established together.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A fuel injection apparatus
   comprising
   a fuel injection valve having a nozzle opening to a combustion chamber and
   an ignition plug,
   wherein said fuel injection valve forms a fuel spray having different levels of average speed, wherein said fuel injection valve forms a fuel spray having relatively high speed at least in half of a single cycle of a fuel injection, and after that, said fuel injection valve forms a fuel spray having relatively low speed.
2. A fuel injection apparatus
   comprising
   a fuel injection valve having a nozzle opening to a combustion chamber and
   an ignition plug,
   wherein said fuel injection valve forms a fuel spray having different levels of average speed,
   wherein said fuel injection valve is placed in a side surface of an engine head, and said ignition plug is placed near a center of said engine head.
3. A fuel injection apparatus of claim 2, wherein one of a tumble and swirl air flow is applied.
4. A fuel injection apparatus, comprising
   a fuel injection valve having a nozzle opening to a combustion chamber and
   an ignition plug,
   wherein said fuel injection valve forms a fuel spray having different levels of average speed, wherein an ignition means is placed in a side surface of an engine head, and a fuel injection means is placed near a center of said engine head.
5. A fuel injection apparatus, comprising
   a fuel injection valve having a nozzle opening to a combustion chamber and
   an ignition plug,
   wherein said fuel injection valve forms a fuel spray having different levels of average speed, wherein a spray angle of a fuel spray having low speed is selected so that said fuel spray may be included on a top of a piston at bottom dead center.
6. A fuel injection apparatus comprising
   a fuel injection valve having a nozzle opening to a combustion chamber and
   an ignition plug,
   wherein said fuel injection valve forms a fuel spray having different levels of average speed, wherein said fuel injection valve has a fuel swirling part at an upper stream of a valve body; and
   among fuel channels in said fuel swirling part, a channel having a larger offset with respect to a nozzle center is placed art an upper stream of a channel having smaller offset.

7. A fuel injection apparatus, comprising a fuel injection valve having a nozzle opening to a combustion chamber and an ignition plug, wherein said fuel injection valve forms a fuel spray having different levels of average speed, wherein said fuel injection valve has a fuel swirling part at an upper stream of a valve body; and a enlarged part is formed at an outlet part of a fuel channel of said fuel swirling part.

8. A fuel injection valve for an engine, provided with a valve body, a valve seat, a nozzle opening and a fuel guide in a nozzle portion, wherein said fuel guide forms a plurality of fuel swirling passages each of which has different strength of swirling.

9. A fuel injection valve according to claim 8, wherein a first group of fuel swirling passages which have a first strength of swirling is formed at the nozzle opening side, compared with a second group of fuel swirling passage which have a larger strength of swirling than said first group.

10. A fuel injection valve according to claim 8, wherein at least one of said swirling passages is inclined to an exit direction of the nozzle opening.

11. A fuel injection valve according to claim 8, wherein at least one unswirl-fuel-chamber is formed inside of said fuel swirling passages in which fuel is unswirled.

12. A fuel injection valve according to claim 8, wherein said fuel guide includes at least one by-pass fuel passage for by-passing the fuel from the upper stream to the lower stream.

13. A fuel injection valve according to claim 12, wherein said at least one by-pass fuel passage comprises a plurality of by-pass passages whose passage areas are different from each other.

14. A fuel injection valve according to claim 8, wherein the passage area of the gap between said valve body and the valve seat is decreased in a direction of the nozzle exit.

15. A fuel injection valve for an engine, provided with a valve body, a valve seat, a nozzle opening and a fuel guide in a nozzle portion, wherein said fuel guide is provided with a plurality of fuel guiding passages formed along an imaginary line which intersects with a center axis line of said nozzle opening, and said fuel guiding passages are formed so that streams of fuel collide.

16. A fuel injection valve for an engine, provided with a valve body, a valve seat, a nozzle opening and a fuel guide in a nozzle portion, wherein said fuel guide is provided with a plurality of fuel guiding passages and a plurality of fuel swirling passages, formed along an imaginary line which intersects with a center axis line of said nozzle opening.

* * * * *